US 6,725,042 B2

(12) United States Patent
Park

(10) Patent No.: US 6,725,042 B2
(45) Date of Patent: Apr. 20, 2004

(54) METHOD FOR HANDLING AN IDLE HANDOFF BETWEEN BASE STATIONS SUPPORTING DIFFERENT SERVICES

(75) Inventor: Sang-Jo Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/232,469

(22) Filed: Aug. 30, 2002

(65) Prior Publication Data

US 2003/0064724 A1 Apr. 3, 2003

(30) Foreign Application Priority Data

Sep. 11, 2001 (KR) ...................................... P2001-55852

(51) Int. Cl.[7] ................................................. H04Q 7/20
(52) U.S. Cl. ........................ 455/436; 455/434; 370/331
(58) Field of Search ................................. 455/434, 435, 455/436, 437, 442, 552.1, 513, 330, 334, 337, 466, 467, 331, 332, 333

(56) References Cited

U.S. PATENT DOCUMENTS

| | | | | |
|---|---|---|---|---|
| 5,504,939 A | * | 4/1996 | Mayrand et al. | 455/450 |
| 5,664,004 A | * | 9/1997 | Durchman et al. | 455/466 |
| 5,761,623 A | * | 6/1998 | Lupien et al. | 455/552.1 |
| 5,924,026 A | * | 7/1999 | Krishnan | 455/414.1 |
| 6,026,300 A | | 2/2000 | Hicks | |
| 6,363,242 B1 | * | 3/2002 | Brown et al. | 455/70 |
| 6,389,298 B1 | * | 5/2002 | Abramovici et al. | 455/552.1 |
| 2001/0027118 A1 | | 10/2001 | Sumino | |

OTHER PUBLICATIONS

Zhao et al. US 2003/0193911 Oct. 2003.*
European Search Report dated Jun. 13, 2003 issued in a counterpart application, namely, Appln No. 02020441.8.

* cited by examiner

Primary Examiner—Charles Appiah
(74) Attorney, Agent, or Firm—Dilworth & Barrese LLP

(57) ABSTRACT

A method for setting a protocol revision value for determining an environment of a service provided by a second base station by a mobile station during a handoff from a first base station to the second base station in an idle state in a mobile communication system including the first base station and the second base station neighboring the first base station, a service supported by the second base station being different from a service supported by the first base station. The mobile station receives an extended system parameter message (ESPM) from the second base station; compares a length of the received ESPM with a length of a preset ESPM; and sets a protocol revision value of the mobile station according to a protocol revision value included in the received ESPM, if the length of the received ESPM is equal to or longer than the length of the preset ESPM.

22 Claims, 4 Drawing Sheets

METHOD FOR HANDLING AN IDLE HANDOFF BETWEEN BASE STATIONS SUPPORTING DIFFERENT SERVICES

PRIORITY

This application claims priority to an application entitled "Method for Handling Idle Handoff between Base Stations Supporting Different Services" filed in the Korean Industrial Property Office on Sep. 11, 2001 and assigned Ser. No. 2001-55852, the contents of which are hereby incorporated by reference.

BACKGROUND OF THE INVENTION

1. Field of the Invention

The present invention relates generally to an idle handoff in a mobile communication system, and in particular, to a method for setting a protocol revision value supported by a mobile station according to a protocol revision value of a target base station during an idle handoff between base stations supporting different services.

2. Description of the Related Art

In general, CDMA (Code Division Multiple Access) communication systems such as IS-95A, IS-95B, and IS-2000 communication systems, and a PCS (Personal Communications System) communication system, i.e., the typical mobile communication systems, are comprised of mobile switching centers (MSC), base stations (BS), and mobile stations (MS). The mobile switching center is connected to at least one base station, and the base station is generally divided into a base station controller (BSC) and a base transceiver system (BTS). The base station covers one cell/sector region, and controls a plurality of mobile stations included in its cell/sector region.

In the CDMA mobile communication system, call processing between a mobile station and a base station is divided into call processing by the mobile station and call processing by the base station.

The call processing by the base station includes pilot and sync channel processing, paging channel processing, access channel processing, and traffic channel processing. During the pilot channel processing, the base station transmits a pilot signal on the pilot channel. During the traffic channel processing, the base station communicates with the mobile station in a traffic state (or MS control on the traffic channel state) using forward and reverse traffic channels. During the access channel processing, the base station monitors the access channel and receives messages transmitted by the mobile station in a system access state. During the paging channel processing, the base station transmits messages on the paging channel monitored by the mobile station in an MS access state or an MS idle state.

The call processing by the mobile station includes an MS initialization state, an MS idle state, a system access state, and a traffic state (or MS control on the traffic channel state). In the initialization state, the mobile station selects and acquires a mobile communication system for communication with the base station. In the system access state, the mobile station transmits messages to the base station over the access channel, and receives messages from the base station over the paging channel assigned thereto. In the traffic state, the mobile station communicates with the base station over the forward and reverse traffic channels.

In the MS idle state, the mobile station monitors a paging channel assigned thereto. In this idle state, the mobile station can receive messages, receive an incoming call, initiate an outgoing call (or origination call), initiate registration, or initiate message transmission. Upon entering the idle state, the mobile station sets a paging channel and a data rate, and monitors the paging channel.

While monitoring the paging channel in the idle state, the mobile station may move to either another base station neighboring the current base station or another sector of the current base station. In this case, the quality of a signal received from the current base station is deteriorated, while the quality of a signal received from the neighboring base station or sector is improved. Therefore, call forward from the current base station to the neighboring base station is performed on the mobile station in the idle state. This procedure is called an "idle handoff". In the mobile communication system, if it is determined that a pilot signal from a new base station other than the current base station is sufficiently higher in strength than a pilot signal from the current base station, the mobile station will initiate an idle handoff to the new (or target) base station.

Meanwhile, with the development of the mobile communication technology and the expansion of the services provided to the subscribers, the CDMA mobile communication system has evolved in the order of IS-95A, IS-95B and IS-2000. That is, the CDMA base station and mobile station have evolved from IS-95A base station and mobile station supporting the IS-95A service into IS-95B or IS-2000 base stations and mobile stations supporting the IS-95B or IS-2000 service. The existing CDMA base station and mobile station may support any one of the 3 services. As circumstances require, the IS-95A mobile station currently in communication with the IS-95A base station may move to the IS-95B or IS-2000 base station, and vice versa. Alternatively, the IS-2000 mobile station currently in communication with the IS-2000 base station may move to the IS-95A base station, and vice versa. That is, an idle handoff between the base stations supporting the different services may occur. Here, "supporting the different services" is equivalent to having different protocol revision values. For example, a protocol revision value for the IS-95A service is 2, a protocol revision value for the IS-95B service is 5 (3 to 5), and a protocol revision value for the IS-2000 service is 6.

When an idle handoff is performed between the base stations having the different protocol revision values, various problems occur.

For example, if an IS-2000 mobile station with a protocol revision value 6 initially accesses an IS-95A base station with a protocol revision value 2 upon power up, the IS-95A base station will set a P_REV field value in a sync channel message field to "2" before transmitting the sync channel message to the IS-2000 mobile station. The IS-2000 mobile station then compares the P_REV value included in the sync channel message with a protocol revision value supported by the IS-2000 mobile station, and operates in a mode of supporting the service corresponding to the smaller protocol revision value. That is, the IS-2000 mobile station operates in a mode of supporting the IS-95A service. At this point, if signal power received from a neighboring base station is higher than signal power received from the initially accessed base station, an idle handoff to the neighboring base station occurs. In this case, even though the neighboring base station is a base station supporting the IS-95B service or above, the IS-2000 mobile station continues to support the IS-95A service without changing the protocol revision value. Therefore, the IS-2000 mobile station will discard some of the messages transmitted by the base station supporting the IS-95B service or above. As a result, the IS-2000 mobile station cannot normally operate.

In another example, if the mobile station initially accesses an IS-95B (or IS-2000) base station upon power up, and then is idle-handed off to an IS-95A base station, the problem will become more serious. This is because although the mobile station attempts to operate in an IS-95B service mode, the target base station to which the mobile station has been handed off is an IS-95A base station, so the mobile station cannot normally operate.

FIG. 1 illustrates an operation for handling protocol revision values during an idle handoff between the base stations supporting different services according to the prior art. Referring to FIG. 1, if a mobile station receives a sync channel message in a sync state (or initialization state) upon power up, the mobile station compares a P_REV field value included in the sync channel message with a protocol revision value supported by the mobile station, and selects the smaller value as a current protocol revision value. The selected protocol revision value remains unchanged even though an idle handoff is performed later. For example, upon receiving a sync channel message from an initially accessed IS-95A base station, the mobile station selects a protocol revision value indicating the IS-95A service and maintains the selected protocol revision value. Accordingly, even though an idle handoff to the IS-95B or IS-2000 base station occurs, the protocol revision value "IS-95A" remains unchanged, as illustrated in FIG. 1. As a result, the mobile station cannot properly receive the services provided by the IS-95B or IS-2000 base station.

In contrast, if the mobile station has received a sync channel message from an initially accessed IS-2000 base station upon power up, a current protocol revision value is set to "IS-2000". Although an idle handoff to a base station having a different protocol revision value ("IS-95A" or "IS-95B") is performed in the idle state, the current protocol revision value "IS-2000" will remain unchanged. Therefore, the mobile station having the protocol revision value "IS-2000" cannot properly receive the service provided by the IS-95A or IS-95B base station.

SUMMARY OF THE INVENTION

It is, therefore, an object of the present invention to provide a method for handling an idle handoff so that a mobile station can properly receive a service provided from a target base station when an idle handoff occurs between base stations supporting different services.

It is another object of the present invention to provide a method for setting a protocol revision value so that a mobile station can receive a service provided by a target base station during an idle handoff in a mobile communication system.

To achieve the above and other objects, the present invention provides a method for setting a protocol revision value for determining an environment of a service provided by a second base station by a mobile station during a handoff from a first base station to the second base station in an idle state in a mobile communication system including the first base station and the second base station neighboring the first base station, a service supported by the second base station being different from a service supported by the first base station.

In accordance with a first aspect of the present invention, the mobile station receives an extended system parameter message (ESPM) from the second base station; compares a length of the received ESPM with a length of a preset ESPM; and sets a protocol revision value of the mobile station according to a protocol revision value included in the received ESPM, if a length of the received ESPM is equal to or longer than a length of the preset ESPM.

In accordance with another aspect of the present invention, the mobile station receives an extended system parameter message (ESPM) from the second base station; compares a length of the received ESPM with a length of a preset ESPM; if a length of the received ESPM is equal to or longer than a length of the preset ESPM, compares a protocol revision value indicating a service supported by the mobile station with a preset protocol revision value and sets a protocol revision value of the mobile station according to the comparison results; compares the set protocol revision value of the mobile station with the preset protocol revision value; and if the set protocol revision value of the mobile station is equal to or larger than the preset protocol revision value, compares the protocol revision value indicating the service supported by the mobile station with a protocol revision value included in the received ESPM and sets a protocol revision value of the mobile station according to the comparison results.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

As used herein, the terms "IS-95A base station", "IS-95B base station" and "IS-2000 base station" refer to a base station supporting an IS-95A service, a base station supporting an IS-95B service, and a base station supporting an IS-2000 service, respectively. The term "protocol revision value" represents a value for determining an environment of the service provided by the base station. That is, the protocol revision value represents a service provided by the base station. In the accompanying drawings, the protocol revision value is represented by "protocol value", for simplicity. Further, the term "idle handoff" refers to a handoff from a first base station to a second base station neighboring the first base station, performed in an idle state of the mobile station.

Figure 1:
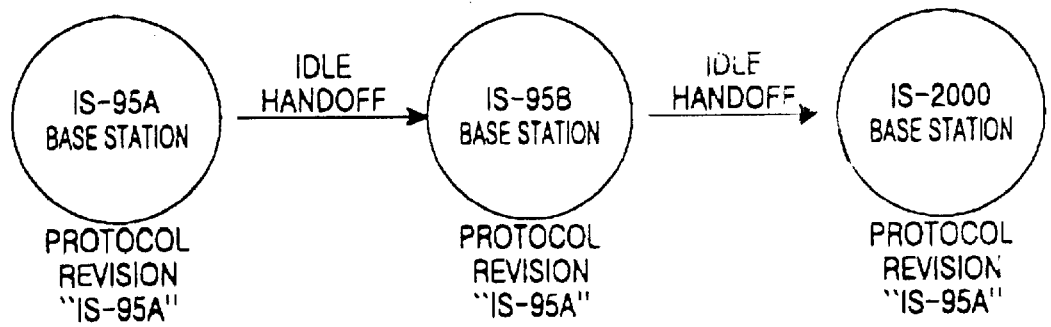
FIG. 1 illustrates an operation for handling protocol revision values during an idle handoff between the base stations supporting different services according to the prior art.
Figure 2:
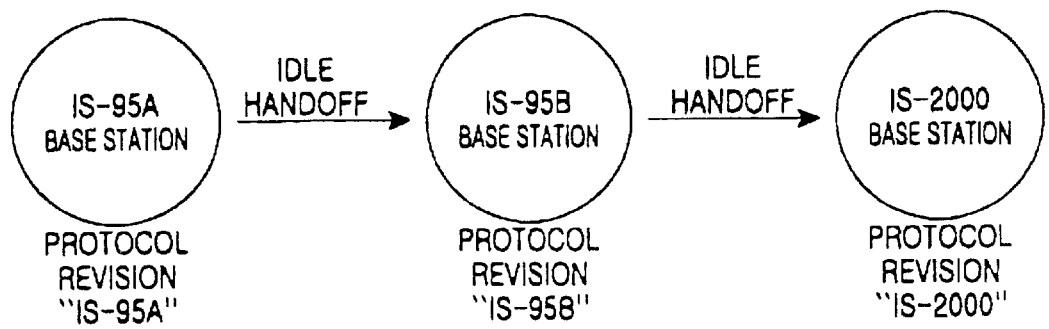
FIG. 2 illustrates an operation for changing a protocol revision value by a mobile station during an idle handoff between base stations supporting different services in a mobile communication system according to an embodiment of the present invention.

FIG. 2 illustrates an operation for changing a protocol revision value by a mobile station during an idle handoff between base stations supporting different services in a mobile communication system according to an embodiment of the present invention. In FIG. 2, if a mobile station with a protocol revision value "IS-2000" receives a sync channel message from an initially accessed IS-95A base station in a sync (or initialization) state, a protocol revision value of the mobile station is set to "IS-95A". In this state, if the mobile station moves to an IS-95B base station, an idle handoff from the IS-95A base station to the IS-95B base station occurs. In this case, the mobile station receives overhead messages from the IS-95B base station. The received overhead messages include an Extended System Parameter Message (ESPM) in which a P_REV field value indicating a protocol revision value for the service supported by the IS-95B base station is included. The mobile station sets its protocol revision value to "IS-95B" according to the P_REV field value in the ESPM. Likewise, even when an idle handoff occurs as the mobile station moves from the IS-95B base station to an IS-2000 base station, the protocol revision value of the mobile station is set to "IS-2000". In this manner, even when an idle handoff occurs, a protocol revision value of the mobile station is set to a protocol revision value indicating the service supported by the target base station. Accordingly, an environment of the service provided by the target base station is determined, so the mobile station can normally receive the service. A detailed description of the embodiment of the present invention will be made herein below with reference to FIGS. 3, 4A, and 4B.

Figure 3:
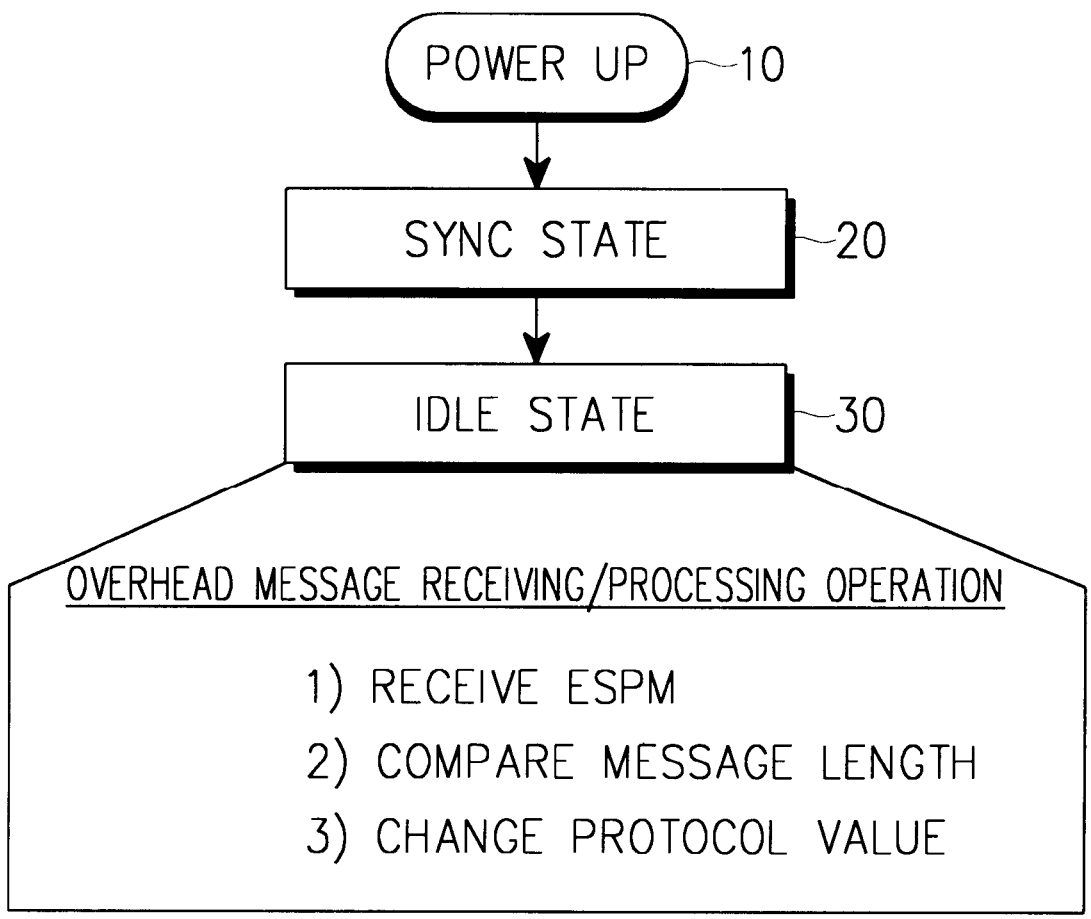
FIG. 3 illustrates a procedure for setting a protocol revision value by a mobile station during an idle handoff between base stations supporting different services in a mobile communication system according to an embodiment of the present invention.

FIG. 3 illustrates a procedure for setting a protocol revision value by a mobile station during an idle handoff between base stations supporting different services in a mobile communication system according to an embodiment of the present invention. It will be assumed herein that the mobile station has a protocol revision value "6", or supports the IS-2000 service.

Referring to FIG. 3, upon a power up in step 10, the mobile station performs a sync state operation in step 20. In the sync state of step 20, the mobile station receives a sync channel message from an initially accessed base station, and analyzes a P_REV field value included in the sync channel message to determine a current protocol revision value. Specifically, the mobile station compares the P_REV field value with a protocol revision value supported by the mobile station, and selects the smaller value as the current protocol revision value.

Next, the mobile station performs an idle state operation in step 30. In the idle state, the mobile station receives overhead messages. The overhead messages include messages as illustrated in Table 1.

TABLE 1

| Message | Contents |
|---|---|
| SPM | System Parameter Message |
| APM | Access Parameter Message |
| NLM | Neighbor List Message |
| CCLM | CDMA Channel List Message |
| ESPM | Extended System Parameter Message |
| ENLM | Extended Neighbor List Message |
| GSRDM | Global Service Redirection Message |
| GNLM | General Neighbor List Message |
| UZIM | User Zone Identification Message |
| PNLM | Private Neighbor List Message |
| EGSRM | Extended Global Service Redirection Message |
| ECCLM | Extended CDMA Channel List Message |

The messages illustrated in Table 1 are selected according to the service supported by the base station. That is, the overhead messages are selected depending on whether the base station supports the IS-95A, J-STD-008 (PCS), IS-95B, or IS-2000 service, as illustrated in Table 2.

TABLE 2

\* IS-95A base station necessarily includes SPM, APM, NLM, and CCLM, but may not include ESPM and GSRDM.
\* J-STD-008 base station necessarily includes SPM, APM, ENLM, and CCLM, but may not include ESPM and GSRDM
\* IS-95B base station necessarily includes SPM, AMP, and CCLM, but may not include ESPM, GNLM, and GSRDM. Further, the IS-95B base station may include NLM and ENLM according to a band class.
\* IS-2000 base station may include all the messages shown in Table 1, but PNLM and UZIM are currently not serviceable. Further, the IS-2000 base station may include NLM and ENLM according to a band class.

Referring back to FIG. 3, in the idle state of step 30, the mobile station performs an overhead message receiving/processing operation. First, the mobile station receives an Extended System Parameter Message (ESPM) from a target base station. Second, the mobile station compares a length of the received ESPM with a length of a preset ESPM. Here, the preset ESPM may be an ESPM for the IS-95B service. Third, if a length of the received ESPM is equal to or longer than a length of the preset ESPM, the mobile station sets its protocol revision value according to a P_REV value included in the received ESPM. The third process is performed when a protocol revision value indicating the service supported by the mobile station is equal to or larger than a preset protocol revision value (e.g., a protocol revision value for the IS-95B service), and also equal to or larger than a P_REV value included in the received ESPM. The P_REV value indicates either the IS-95B service or the IS-2000 service.

Figure 4A:
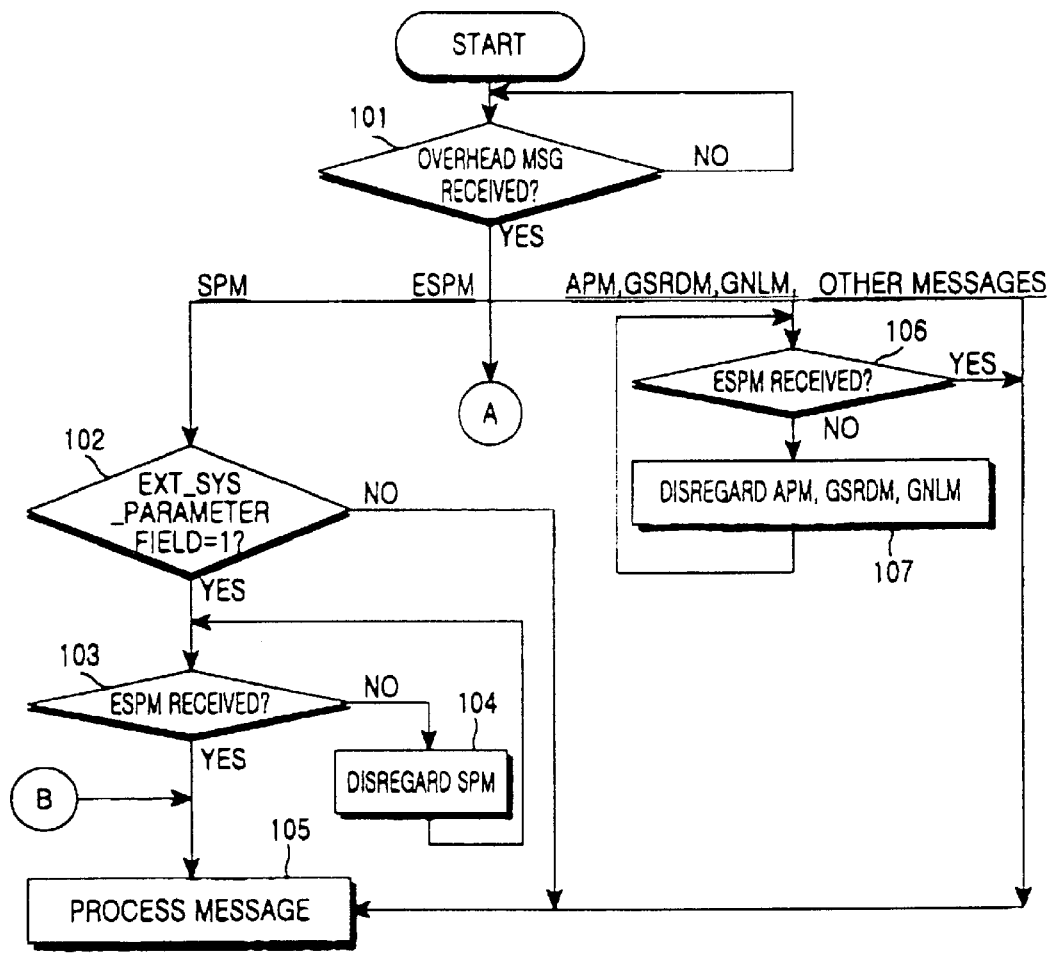
FIGS. 4A and 4B illustrate a detailed procedure for receiving an overhead message and setting a protocol revision value in an idle state.
Figure 4B:
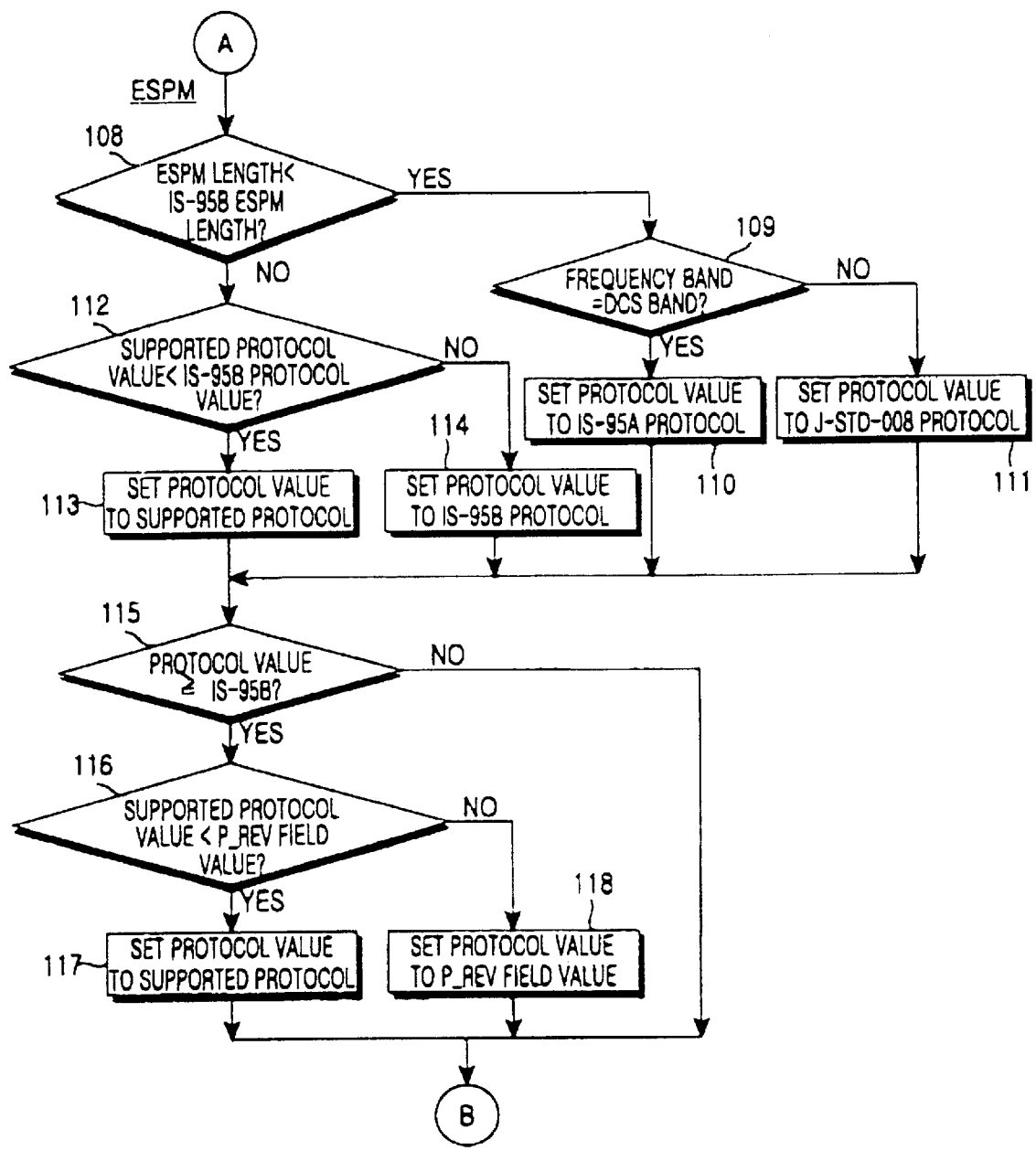

FIGS. 4A and 4B illustrate a detailed procedure for receiving an overhead message and setting a protocol revision value in an idle state. Referring to FIG. 4A, in step 101, the mobile station receives an overhead message from a target base station during an idle handoff. Some of the overhead messages have different fields according to the protocol revision value. Therefore, in step 106, the mobile station determines whether the ESPM is received along with an APM, a GSRDM, a GNLM, or any other messages. If not, the mobile station disregards these messages in step 107 and reattempts to receive the ESPM in step 106. Once the ESPM is received, the mobile station processes the message in step 105.

Upon receiving a System Parameter Message (SPM) among the overhead messages in step 101, the mobile station performs an operation of steps 102 to 104. In step 102, the mobile station determines whether an EXT_SYS_PARAMETER field value in the SPM is "1". Here, the EXT_SYS_PARAMETER field is a flag indicating whether the ESPM is included in the overhead message. If the EXT_SYS_PARAMETER field value is "1" in step 102, the mobile station determines in step 103 whether the EPSM is received, and disregards the SPM in step 104, if the ESPM is not received in step 103, and returns to step 103 after disregarding the SPM. Otherwise, if the EXT_SYS_PARAMETER field value is "0" or the ESPM is received in step 103, the mobile station processes the SPM in step 105.

Referring to FIG. 4B, upon receiving an Extended System Parameter Message (ESPM) among the overhead messages, the mobile station performs an operation of steps 108 to 118. Before a detailed description of an operation of receiving the ESPM, the ESPM fields will be described. The ESPM includes the fields illustrated in Table 3.

TABLE 3

| FIELD | LENGTH (BITS) | PROTOCOL REVISION |
|---|---|---|
| PILOT_PN | 9 | J-STD-008, IS-95A, or IS-95B |
| CONFIG_MSG_SEQ | 6 | or above |
| DELETE_FOR_TMSI | 1 | IS-95B or above |
| USE_TMSI | 1 | |
| PREF_MSID_TYPE | 2 | J-STD-008, IS-95A, or 1S-95B |
| MCC | 10 | or above |
| IMSI_11_12 | 7 | |
| TMSI_ZONE_LEN | 4 | |
| TMSI_ZONE | 8 * TMSI_ZONE_LEN | J-STD-008, or IS-95B or above |
| BCAST_INDEX | 3 | J-STD-008, IS-95A, or IS-95B or above |
| IMSI_T_SUPPORTED | 1 | IS-95B or above |
| P_REV | 8 | |
| MIN_P_REV | 8 | |
| SOFT_SLOPE | 6 | |
| ADD_INTERCEPT | 6 | |
| DROP_INTERCEPT | 6 | |
| PACKET_ZONE_ID | 8 | |
| MAX_NUM_ALT_SO | 3 | |
| RESELECT_INCLUDED | 1 | |
| EC_THRESH | 0 or 5 | |
| EC_IO_THRESH | 0 or 5 | |
| PILOT_REPORT | 1 | |
| NGHBR_SET_ENTRY_INFO | 1 | |
| ACC_ENT_HO_ORDER | 0 or 1 | |
| NGHBR_SET_ACCESS_INFO | 1 | |
| ACCESS_HO | 0 or 1 | |
| ACCESS_HO_MSG_RSP | 0 or 1 | |
| ACCESS_PROBE_HO | 0 or 1 | |
| ACC_HO_LIST_UPD | 0 or 1 | |
| ACC_PROBE_HO_OTHER_MSG | 0 or 1 | |
| MAX_NUM_PROBE_HO | 0 or 3 | |
| NGHBR_SET_SIZE | 0 or 6 | |
| ACCESS_ENTRY_HO | 1 *NGHBR_SET_SIZE | |
| ACCESS_HO_ALLOWED | 1 *NGHBR_SET_SIZE | |
| BROADCAST_GPS_ASST | 1 | IS-2000 or above |
| QPCH_SUPPORTED | 1 | |
| NUM_QPCH | 0 or 2 | |
| QPCH_RATE | 0 or 1 | |
| QPCH_POWER_LEVEL_PAGE | 0 or 3 | |
| QPCH_CCI_SUPPORTED | 0 or 1 | |
| QPCH_POWER_LEVEL_CONFIG | 0 or 3 | |
| SDB_SUPPORTED | 1 | |
| RLGAIN_TRAFFIC_PILOT | 6 | |
| REV_PWR_CNTL_DELAY_INCL | 1 | |
| REV_PWR_CNTL_DELAY | 0 or 2 | |

The P_REV field illustrated in Table 3, a field indicating a protocol revision value of the base station, exists only in IS-95B or above.

Referring back to FIG. 4B, in step 108, the mobile station compares a length of the received ESPM with a length of a preset ESPM (e.g., IS-95B length). Here, the term "IS-95B length" refers to a minimum length used to transmit the ESPM from the IS-95B base station to the mobile station. That is, since the IS-95B length means a fixed length value, the sum of lengths of the fields except the fields represented with "0" or "1" becomes 93 bits. An ACCESS_ENTRY_HO field, the bottom field of the ESPM for the IS-95B, exists when an NGHBR_SET_ENTRY_INFO field value is "1", and an ACCESS_HO_ALLOWED field exists when NGHBR_SET_ACCESS_INFO field value is "1".

If a length of the received ESPM is equal to or longer than a length of the preset ESPM, the mobile station performs an operation of steps 112 to 118. Otherwise, if a length of the received ESPM is shorter than a length of the preset ESPM, the mobile station performs an operation of steps 109 to 111.

In step 109, the mobile station determines whether a frequency band used is equal to a DCS (Digital Cellular System) band. If the frequency band in use is equal to the DCS band, the mobile station sets its protocol revision value to a protocol revision value for the IS-95A service in step 110. However, if the frequency band in use does not equal the DCS band, the mobile station sets its protocol revision value to a J-STD-008 protocol revision value for the PCS service in step 111. After steps 110 and 111, the mobile station proceeds to step 115.

In step 112, the mobile station compares the protocol revision value indicating the service supported by the mobile station with a preset protocol value (e.g., IS-95B protocol value), and sets its protocol revision value according to the comparison results. If the protocol revision value supported by the mobile station is smaller than the preset protocol revision value, the mobile station sets its protocol revision value to the protocol revision value supported by the mobile station in step 113. However, if the protocol revision value supported by the mobile station is equal to or larger than the preset protocol revision value in step 112, the mobile station sets its protocol revision value to the preset protocol revision value in step 114. After steps 113 and 114, the mobile station proceeds to step 115.

In step 115, the mobile station compares the protocol revision value set in step 110, 111, 113, or 114 with the preset protocol revision value. If the set protocol revision value is smaller than the preset protocol revision value, the mobile station proceeds to step 105 of FIG. 4A. Otherwise, if the set protocol revision value is equal to or larger than the preset protocol revision value, the mobile station compares the protocol revision value supported by the mobile station with the P_REV field value indicating the protocol revision value included in the received ESPM in step 116, and sets its protocol revision value according to the comparison results.

If the protocol revision value supported by the mobile station is smaller than the protocol revision value included in the received ESPM in step 116, the mobile station sets its protocol revision value to the protocol revision value supported by the mobile station in step 117. Otherwise, if the protocol revision value supported by the mobile station is equal to or larger than the protocol revision value included in the received ESPM, the mobile station sets its protocol revision value to the P_REV field value included in the received ESPM in step 118. The P_REV field value included in the received ESPM represents the IS-95B service or the IS-2000 service.

The expression "process message" in step 105 means performing an operation of storing fields within the message received from the base station in a global variable and transmitting the field values needed by another task such as a search task. Therefore, after step 115, 117, or 118, the mobile station stores fields within the ESPM in the global variable and transmits field values needed by another task, in step 105. The expression "disregard SPM" in step 104 means not performing an operation of storing fields within the received SPM message in a global variable and transmitting the field values needed by another task. The disregarding operation in step 107 is similar to the disregarding operation of step 104.

To Summarize, in the sync state, the mobile station receives a sync channel message from the base station, compares the P_REV field value with the protocol revision value supported by the mobile station, and sets its current protocol revision value to the smaller value. Here, it is assumed that the mobile station supports the IS-2000 service.

If the mobile station receives a sync channel message from an initially accessed IS-95A base station in the sync channel state, the current protocol revision value of the mobile station becomes "IS-95A". Thereafter, if an idle handoff from the IS-95A base station to a new base station having a different protocol revision value occurs, the mobile station receives an overhead message from the new (or target) base station. Upon receiving the overhead message, the mobile station analyzes the P_REV field values of the ESPM received from the target base station and sets its current protocol revision value according to the analysis, resulting in a change in an environment of the service provided by the base station. For example, if the protocol revision value is "IS-95A", the service is performed at a data rate of a maximum of 9.6 Kbps. If the protocol revision value is "IS-95B", the service is performed at a data rate of a maximum of 76.8 Kbps. If the protocol revision value is "IS-2000", the service is performed at a data rate of a maximum of 153.6 Kbps.

As described above, the present invention effectively performs an idle handoff between base stations having different protocol revision values, so the mobile station can properly receive a desired service, thus improving the system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for setting a protocol revision value for determining an environment of a service provided by a second base station by a mobile station during a handoff from a first base station to the second base station in an idle state in a mobile communication system including the first base station and the second base station neighboring the first base station, a service supported by the second base station being different from a service supported by the first base station, the method comprising the steps of:

receiving an extended system parameter message (ESPM) from the second base station;

comparing a length of the received ESPM with a length of a preset ESPM; and setting a protocol revision value of the mobile station according to a protocol revision value included in the received ESPM, if the length of the received ESPM is equal to or longer than the length of the preset ESPM.

2. The method of claim 1, wherein the setting step is performed when a protocol revision value indicating a service supported by the mobile station is equal to or larger than a preset protocol revision value, and also equal to or larger than the protocol revision value included in the received ESPM.

3. The method of claim 2, wherein the preset protocol revision value is a protocol revision value for an IS-95B service.

4. The method of claim 1, wherein the preset ESPM is an ESPM for an IS-95B service.

5. The method of claim 1, wherein the protocol revision value included in the received ESPM indicates an IS-95B service.

6. The method of claim 1, wherein the protocol revision value included in the received ESPM indicates an IS-2000 service.

7. The method of claim 1, further comprising a step of analyzing a frequency band used by the mobile station and setting the protocol revision value of the mobile station according to the analysis results, if the length of the received ESPM is short than the length of the preset ESPM.

8. The method of claim 7, wherein if the frequency band used by the mobile station is equal to a DCS (Digital Cellular System) band, the protocol revision value of the mobile station is set to a protocol revision value for the IS-95A service.

9. The method of claim 7, wherein if the frequency band used by the mobile station is not equal to a DCS band, the protocol revision value of the mobile station is set to a protocol revision value for a PCS (Personal Communications System) service.

10. A method for setting a protocol revision value for determining an environment of a service provided by a second base station by a mobile station during a handoff from a first base station to the second base station in an idle state in a mobile communication system including the first base station and the second base station neighboring the first base station, a service supported by the second base station being different from a service supported by the first base station, the method comprising the steps of:

(a) receiving an extended system parameter message (ESPM) from the second base station;

(b) comparing a length of the received ESPM with a length of a preset ESPM;

(c) if the length of the received ESPM is equal to or longer than the length of the preset ESPM, comparing a protocol revision value indicating a service supported by the mobile station with a preset protocol revision value and setting a protocol revision value of the mobile station according to the comparison results;

(d) comparing the set protocol revision value of the mobile station with the preset protocol revision value; and (e) if the set protocol revision value of the mobile station is equal to or larger than the preset protocol revision value, comparing the protocol revision value indicating the service supported by the mobile station with a protocol revision value included in the received ESPM and setting the protocol revision value of the mobile station according to the comparison results.

11. The method of claim 10, wherein the preset ESPM is an ESPM for an IS-95B service.

12. The method of claim 10, wherein if the protocol revision value supported by the mobile station is less than the preset protocol revision value set in the step (c), the protocol revision value of the mobile station is set to the protocol revision value supported by the mobile station.

13. The method of claim 10, wherein if the protocol revision value supported by the mobile station is equal to or larger than the preset protocol revision value set in the step (c), the protocol revision value of the mobile station is set to the preset protocol revision value.

14. The method of claim 12, wherein the preset protocol revision value is a protocol revision value for an IS-95B service.

15. The method of claim 13, wherein the preset protocol revision value is a protocol revision value for an IS-95B service.

16. The method of claim 10, wherein if the protocol revision value supported by the mobile station is less than the protocol revision value included in the received ESPM in the step (e), the protocol revision value of the mobile station is set to the protocol revision value supported by the mobile station.

17. The method of claim 10, wherein if the protocol revision value supported by the mobile station is equal to or larger than the protocol revision value included in the received ESPM in the step (e), the protocol revision value of the mobile station is set to the protocol revision value included in the received ESPM.

18. The method of claim 17, wherein the protocol revision value included in the received ESPM indicates the IS-95B service.

19. The method of claim 17, wherein the protocol revision value included in the received ESPM indicates an IS-2000 service.

20. The method of claim 10, further comprising a step of analyzing a frequency band used by the mobile station and setting the protocol revision value of the mobile station according to the analysis results, if the length of the received ESPM is shorter than the length of the preset ESPM.

21. The method of claim 20, wherein if the frequency band used by the mobile station is equal to a DCS (Digital Cellular System) band, the protocol revision value of the mobile station is set to a protocol revision value for the IS-95A service.

22. The method of claim 20, wherein if the frequency band used by the mobile station is not equal to a DCS band, the protocol revision value of the mobile station is set to a protocol revision value for a PCS (Personal Communications System) service.

* * * * *